Oct. 14, 1947.　　　　M. BRANDT　　　　2,429,120
CONVERTIBLE GARDEN TOOL
Filed April 23, 1945
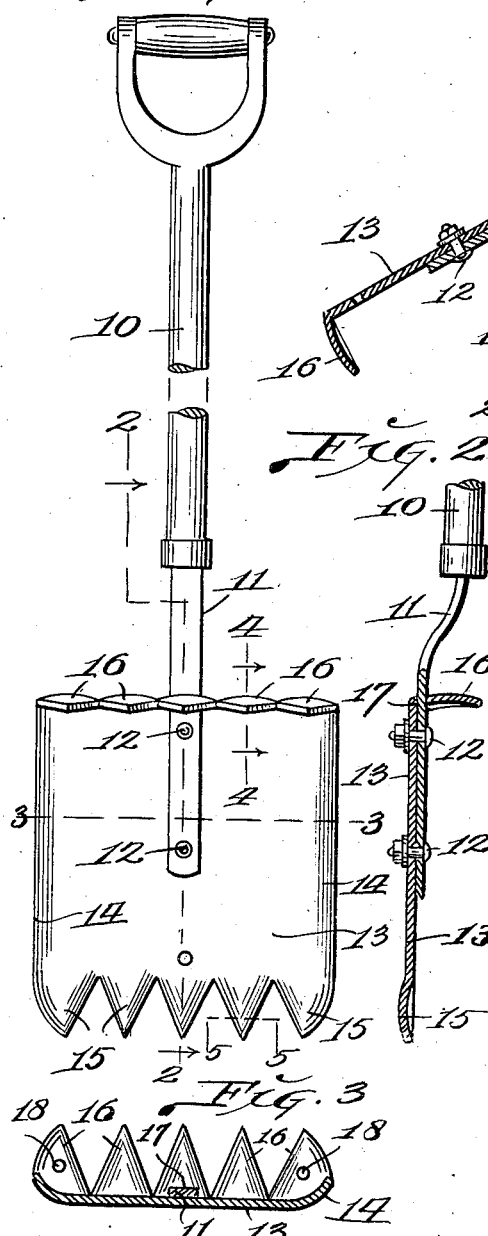
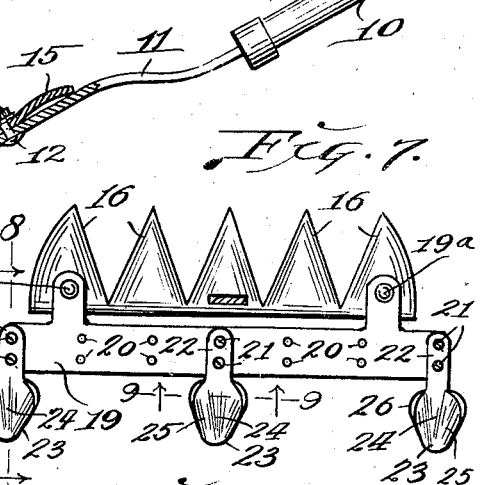
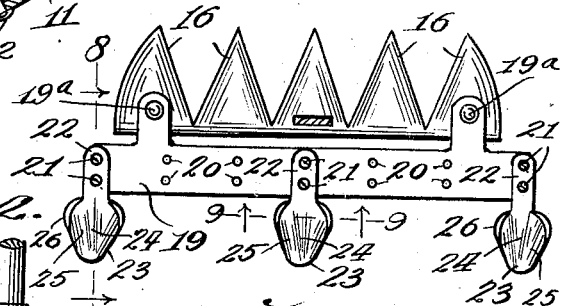
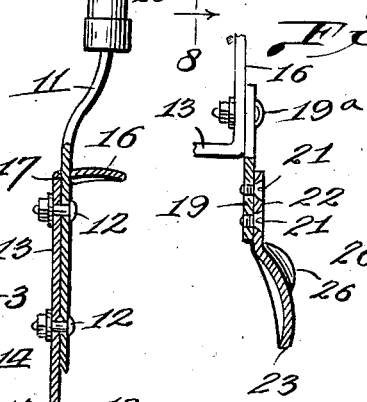
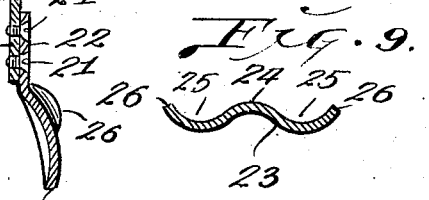
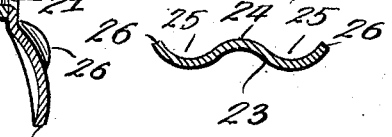
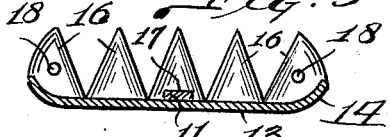
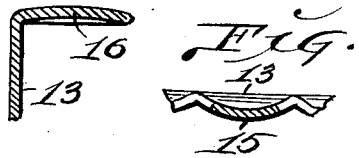
INVENTOR.
MAX BRANDT.
BY
ATTY.

UNITED STATES PATENT OFFICE 2,429,120

CONVERTIBLE GARDEN TOOL

Max Brandt, Los Angeles, Calif.

Application April 23, 1945, Serial No. 589,881

1 Claim. (Cl. 97—66)

My invention relates to a convertible garden tool and has for its principal objects, to provide a simple, practical, strong and durable structure, composed of few parts which may be readily assembled to form a shovel or spade, a hoe or rake, or a furrow farming tool, and further to construct the furrow farming parts, so that same may be readily adjusted in order to plow furrows spaced different distances apart.

With the foregoing and other objects in view my invention consists in certain novel features of construction and arrangement of parts, which will be hereinafter more fully described and claimed and illustrated in the accompanying drawings, in which:

Fig. 1 is a front view of the tool, when the parts thereof are assembled to form a spade or shovel.

Fig. 2 is a vertical section taken on the line 2—2 of Fig. 1.

Fig. 3 is a cross section taken on the line 3—3 of Fig. 1.

Fig. 4 is an enlarged detail section taken on the line 4—4 of Fig. 1.

Fig. 5 is an enlarged cross section taken on the line 5—5 of Fig. 1.

Fig. 6 is a longitudinal section taken through the lower portion of the tool when the parts thereof are assembled to form a hoe or rake.

Fig. 7 is an end elevation of the tool and showing the furrow farming attachment applied thereto.

Fig. 8 is an enlarged vertical section taken on the line 8—8 of Fig. 7.

Fig. 9 is an enlarged cross section taken on the line 9—9 of Fig. 1.

Referring by numerals to the accompanying drawings, which illustrate a preferred embodiment of my invention, 10 designates a conventional spade or shovel handle, to the distal end of which is secured one end of a metal bar 11, to which is detachably secured by bolts or screws 12, the body 13 of the shovel or spade.

This body is preferably formed from a simple piece of sheet metal of suitable thickness, substantially rectangular in shape and having upturned side edges as designated by 14.

One end of body 13 is provided with a series of substantially V-shaped teeth 15, which are slightly curved in cross section as illustrated in Fig. 5. These teeth form the entering edge of the tool, when same is used as a spade or shovel.

Formed integral with the opposite end of body 13 and projecting at right angles thereto, is a series of triangular teeth 16, curved in both longitudinal section as illustrated in Fig. 4, and transversely as seen in Fig. 2, and these teeth function when the tool is used as a hoe or rake.

Formed through the base portion of the central one of the teeth 16 is an aperture 17, for the accommodation of bar 11, when body 13 is secured thereto, to form a spade or shovel (see Figs. 1, 2 and 3).

In order that the furrow farming attachment may be secured to body 13, the teeth 16 at the sides of said body are provided with apertures 18 (see Fig. 3). The furrowing attachment includes a metal plate 19, slightly longer than the width of body 13 and formed in said plate, in spaced relation lengthwise thereof, are pairs of apertures 20, for the reception of screws or bolts 21, which pass through and secure the shanks 22 of small furrow farming plows or shovels 23.

The longitudinal centers of these plows are pressed outwardly or forwardly, to form ribs such as 24 (see Figs. 8 and 9) with inclined channels such as 25 to the sides of said ribs and the upper portions of the sides of said plows are curved forwardly, as designated by 26, to form shares.

The formation of a plurality of sets of apertures 20 in plate 19 enables different numbers of the furrow farming members to be mounted on said plate, thus regulating the spaced relation of the furrows formed with the tool.

In Fig. 9 I have shown three members 23 attached to plate 19. Plate 19 is detachably secured to the end teeth 16 by bolts or screws 19$^a$.

The teeth 15 enable the tool body 13 to more easily cut through hard crust and sod when the tool is used as a spade and when so used, the teeth 16 projecting at right angles to body 13, provides a substantial bearing for the user's foot while applying pressure to the tool.

When used as a shovel, the teeth 16 provide a substantial rear wall for the tool. When the tool is converted from a spade and shovel into a hoe or rake, the bar 11 is detached from body 13 and after said bar and handle have been turned end for end, the bar is applied to the front face of said body with its end terminating adjacent the rake teeth 16, and the reassembled parts are rigidly connected by the screws or bolts 12.

Thus it will be seen that I have provided a convertible garden tool that is simple, strong and durable in structure, inexpensive of manufacture, and very effective in performing the functions for which it is intended.

It will be understood that minor changes in the size, form and construction of the various parts of my improved garden tool may be made and substituted for those herein shown and described without departing from the spirit of the invention, the scope of which is set forth in the appended claim.

I claim as my invention:

In a convertible garden tool, a handle, a bar projecting from one end of said handle; said bar being provided with spaced apertures, a plate, teeth on one end of said plate, teeth projecting at right angles from the other end of said plate, the central one of said last mentioned teeth being provided with an aperture for the reception of said bar, said plate and bar being provided with apertures adapted to register when said plate is in both normal and reversed positions on said bar and releasable fastenings passing through said registering apertures.

MAX BRANDT.

REFERENCES CITED

The following references are of record in the file of this patent:

UNITED STATES PATENTS

| Number | Name | Date |
| --- | --- | --- |
| 1,218,145 | Whittier | Mar. 6, 1917 |
| 2,201,436 | Jones | May 21, 1940 |
| 1,578,532 | Lagorio | Mar. 30, 1926 |
| 1,666,374 | Gatti | Apr. 17, 1928 |
| 677,405 | Ferris | July 2, 1901 |
| 421,117 | Voltz | Feb. 11, 1890 |
| 933,986 | Hosmer | Sept. 14, 1909 |

FOREIGN PATENTS

| Number | Country | Date |
| --- | --- | --- |
| 379,256 | Germany | Aug. 18, 1923 |